United States Patent [19]

Wurtz

[11] 4,186,313
[45] Jan. 29, 1980

[54] WIND GENERATOR

[76] Inventor: Frank R. Wurtz, 4570 Apricot Rd., Simi Valley, Calif. 93063

[21] Appl. No.: 882,377

[22] Filed: Mar. 1, 1978

[51] Int. Cl.² .......................... H02P 9/04; F03D 9/00
[52] U.S. Cl. ...................................... 290/44; 290/55; 416/17; 416/117; 416/116
[58] Field of Search ...................... 290/44, 55; 416/17, 416/112, 113, 114, 115, 116, 117, 118

[56] References Cited

U.S. PATENT DOCUMENTS

| 261,985 | 8/1882 | Beardsley | 416/113 |
| 744,786 | 11/1903 | McDonald | 416/113 |
| 794,706 | 7/1905 | Fine | 416/17 |
| 985,131 | 2/1911 | Bennett | 416/17 |
| 1,540,609 | 6/1925 | Debay | 416/112 |
| 4,113,408 | 9/1978 | Wurtz et al. | 416/117 |

FOREIGN PATENT DOCUMENTS 300424  9/1917  Fed. Rep. of Germany ........... 416/117

*Primary Examiner*—B. Dobeck
*Assistant Examiner*—Eugene S. Indyk

[57] ABSTRACT

A wind operated generator is disclosed herein having a stationary frame or base rotatably supporting at least four sets of pivotal blades intended to be driven by impinging wind currents. Each set of blades operate in unison for opening and closing air passageways between adjacent ones of the blades as the sets of blades rotate about a common vertical axis. A wind direction sensor is provided which moves into the direction of the wind and electro-mechanical or mechanical interface networks operably couple the wind direction sensor to the respective sets of blades whereby the blades are responsive to wind direction so as to be properly feathered to propel the sets of blades. By employment of the interface network, those blades that are in position to actuate or rotate the windmill will receive the full force of the wind while other blades which are not in a position to accomplish the proper operation will be turned to permit passage of the wind thereby.

10 Claims, 4 Drawing Figures

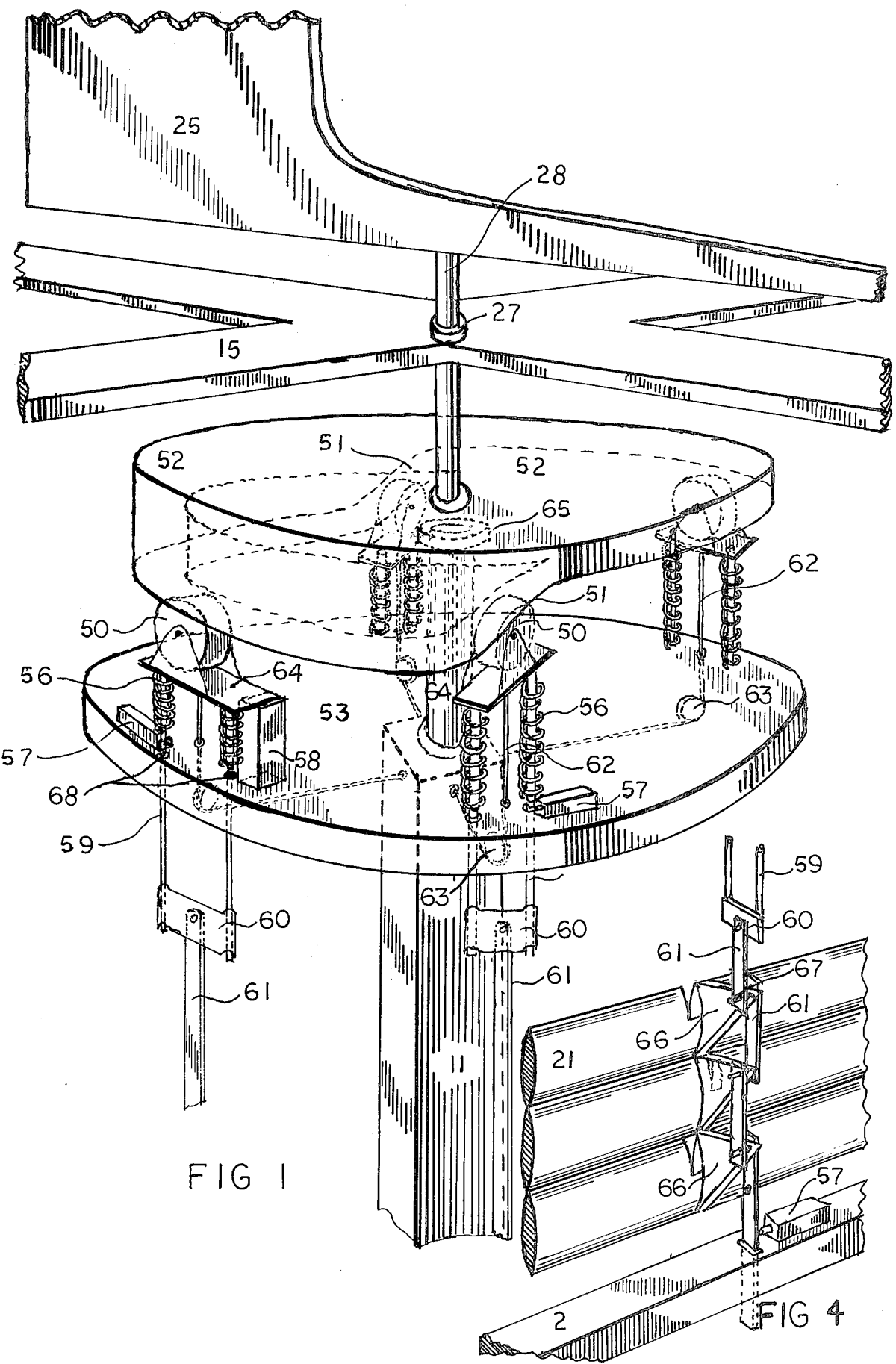

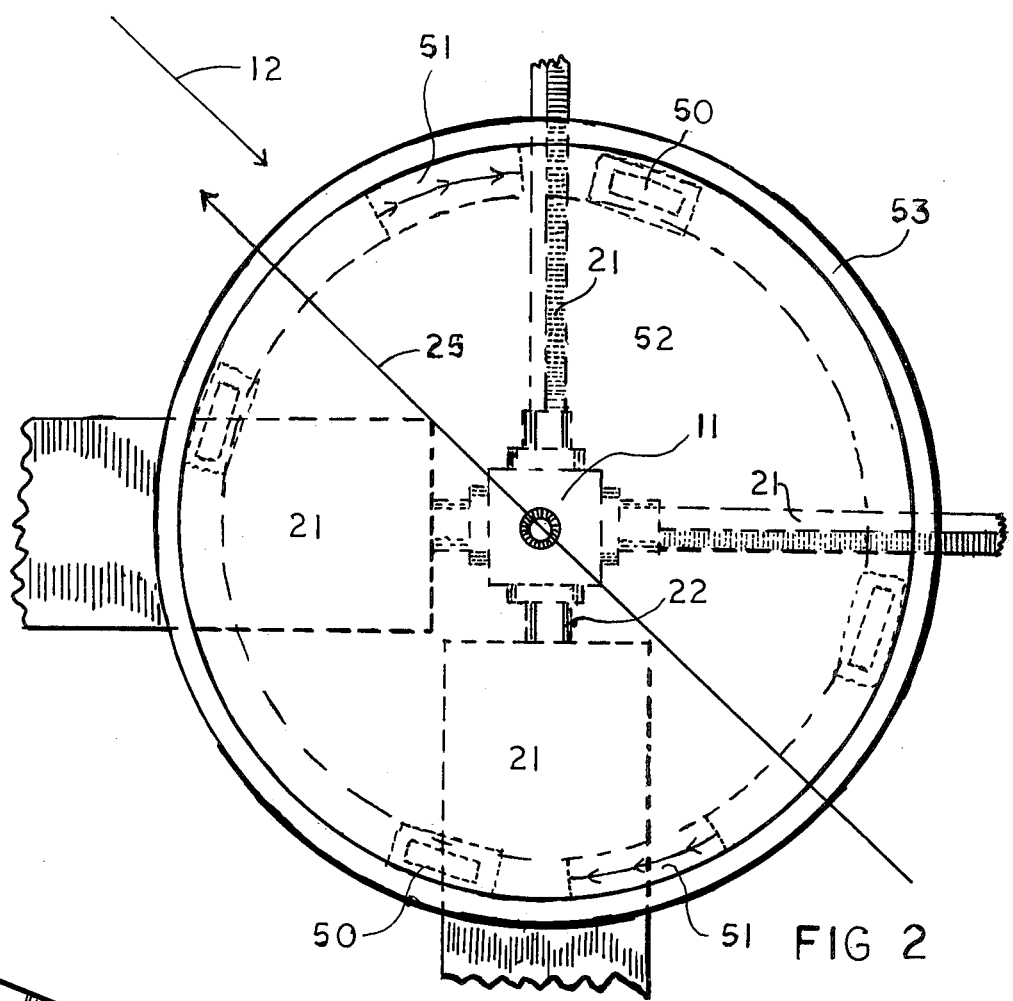
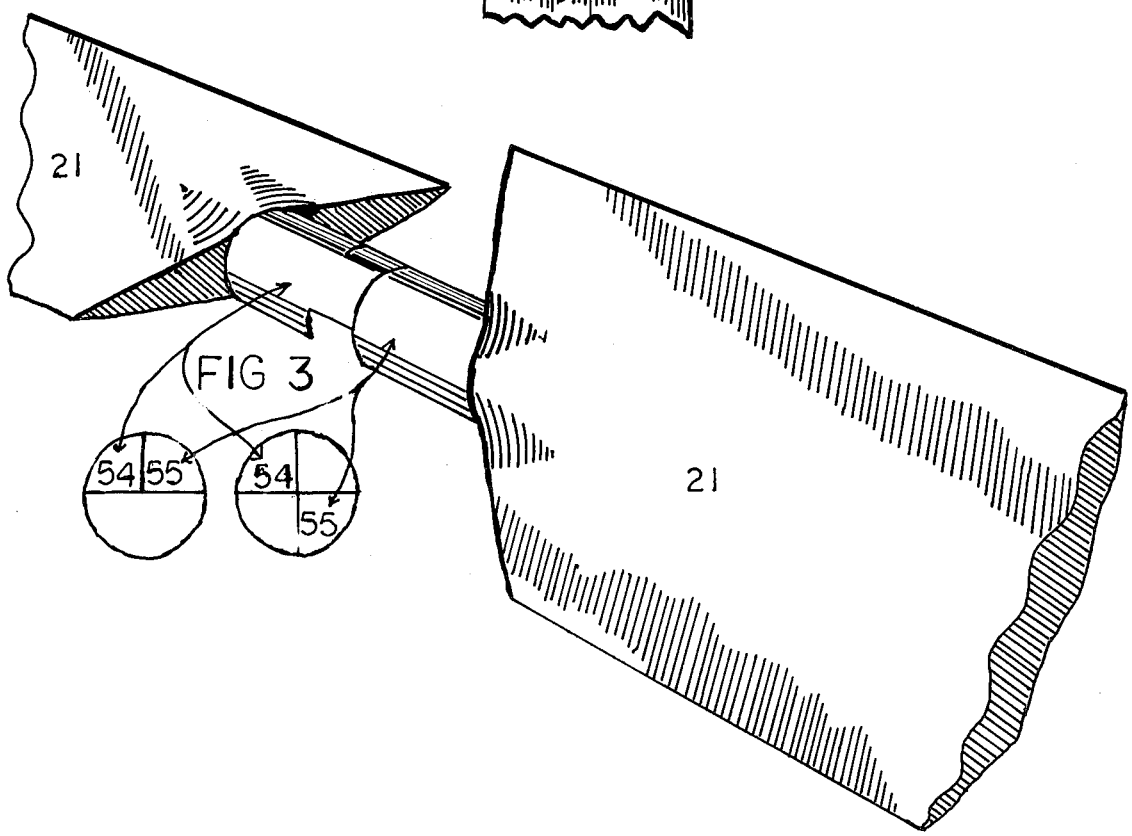

WIND GENERATOR

BACKGROUND OF THE INVENTION

1. Field of the Invention

This invention relates to the field of revolving windmills and more particularly to a windmill structure having a plurality of feathering blades adapted to be automatically set by the motion or direction of the wind via electro-mechanical of mechanical interface means.

2. Brief Description of the Prior Art

In the past, it has been the conventional practice to employ windmills for converting the strength of the wind to useful power or work. Such a conversion is extremely important in modern times when energy supplies are being recognized as limited and the non-polluting, almost always available source of power in the wind is an important resource to be developed. Formerly, windmills have performed various useful tasks such as pumping water, generating power and operating machinery and the like. Usually, such windmills utilize the well-known vertical plane, horizontal axis windmills which employ rudder means to maintain the fan or blades of the mill facing into the wind so as to maximize power output. In many instances, considerable drag is imposed on the fans, louvers or blades of the windmill as the rotation of the mill causes the blades to meet the oncoming wind stream in a closed position. To avoid this problem, mechanical devices have been employed for moving the blades or vanes into feathering or operating positions; however, such mechanisms themselves are often complex, expensive, unwieldy and ineffecient. Such prior attempts at providing automatic feathering using mechanical means are shown and described in U.S. Pat. Nos. 609,378, 3,920,354 and 2,006,024. The mechanical means for positioning the blades or vanes from operating positions normally closing air passage ways through the windmill and in feathering positions so that the air passageways are open to oncoming air are slow in response to change of wind conditions and direction so that the efficiency of the windmill is greatly reduced.

Therefore, there has been a long standing need to provide a wind generator system having an interface means responsive to change of wind direction for operatively positioning or feathering the blades or vanes of a windmill system. The response time should be rapid and sensitivity of change in wind direction must be provided.

SUMMARY OF THIS SUPPLEMENT

Accordingly, the above problems and difficulties encountered with the prior systems are obviated by the present invention which provides a wind generator system having a stationary frame supporting at least four sets of pivotal vanes or blades mounted so as to rotate about a vertical axis. Means are provided on each set of blades for moving the blades between positions of fully closed and fully opened so that the plurality of blade sets will rotate about the vertical axis whereby blades moving against the wind will be feathered and those blades moving with the wind will be closed. The feature of the present supplement is to provide mechanical means serving as an interface between a wind direction sensor and the pivotal blades carried on each of the sets for operating or positioning the blades in response to wind change.

The wind generator is the same as shown and described in the afore mention application Ser. No. 772,270 now U.S. Pat. No. 4,113,408 the disclosure of which is hereby incorporated by reference with the addition of a mechanical means of opening and closing the vanes or blades in accordance with information furnished by a wind direction sensor. By employment of the interface network described, those blades that are in position to actuate or rotate the windmill will receive the full force of the wind while the opposite set of blades will automatically be feathered for minimum wind resistance.

This interface network is arranged to cause an exact 90 degree movement of the vanes or blades from fully closed to fully opened and the period of movement is a fixed number of degrees regardless of the speed of the wind generator.

Therefore, it is among the primary objects of the present invention to provide a windmill generator system arranged with feathering blades or vanes having mechanical means interconnected to and responsive to a wind direction sensor so as to position or rearrange the blades accordingly.

Another object of the present invention is to provide a novel windmill having a plurality of feathering blades adapted to be automatically set by the action of the wind via mechanical means whereby effeciency and simplicity of construction is provided.

Still another object of the present invention is to privide a novel wind generator system having a plurality of sets of pivotal vanes or blades adapted to rotate about a vertical axis wherin the pivotal positioning of the blades of each set are responsive to a sensing and detecting means coupled to the blades via mechanical coupling means.

Yet another object of the present invention is to privide an improved windmill for producing power incorporating mechanical interface means between a wind sensor and a pivotal blades wherein the overall efficiency and sensitivity of the apparatus is enhanced.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is an enlarged perspective of the mechanical control system for operating the blades in accordance with the position of the windvane, showing a method of causing one set of blades to assist another set of blades to assume its needed angle.

FIG. 2 is a top view looking down showing the new control system. The arrow 25 represents the wind vane which is opposite to the direction of the wind 12.

FIG. 3 is a drawing showing one method of causing one set of blades movement to assist another set of blades to assume its needed angle.

FIG. 4 is a drawing showing the coupling system which operates the blades by means of the control system of FIG. 1.

DESCRIPTION OF THE PREFERRED EMBODIMENT

The description of the operating principle of this supplement will be given with reference to the original patent application Ser. No. 772,270, now U.S. Pat. No. 4,113,408 the disclosure of which is hereby incorporated by reference.

As shown in perspective in FIG. 1 the control mechanism consists of ½ of a squash plate 52 in the position of the disc 30 in FIG. 1 of the above mentioned patent application. This squash plate 52 could be any diameter but ½ the diameter of the wind generator would be a good size to position the opening and closing mechanism, FIG. 4, in the center of the generator blades 21.

The squash plate 52 is solidly attached to the shaft 28 which is solidly attached to the windvane and rotates with the wind vane 25 in accordance with the direction of the wind 12 through the bearing 27 mounted in the top frame 15.

The wheels 50 are attached to a plate 64 which has rods 59 attached to it which move in a verticle direction through verticle bearings 68 and with the connector 60 actuate the blades or vanes 21 via the coupler 61.

The bottom plate 53 through which the rods 59 move is solidly attached to the shafts 11 and 64 and is coupled to the squash plate 22 by the bearing 65. This bearing 65 provides side support only and keeps the squash plate 52 alligned to the bottom plate 53 for proper operation.

One way of causing one set of blades that are closing to help the opposite set of blades to open is by the action of the cable 62 stretched tightly between opposite wheel plates 64 through pulleys 63. When a wheel 50 reaches the upwards slope 51 the compressed springs 56 push this wheel up and the cable 62 helps to pull the opposite wheel down.

The center of the slopes 51 on the squash plate 52 are exactly 180 degrees apart and the period of both are exactly the same percentage of the circumference. Ten percent down on one will be ten percent up on the other one.

FIG. 2 is a top view showing the position of the blades 21 with respect to the squash plate 52. The arrow 25 represents the wind vane and the wind direction by arrow 12. The top portion of the squash plate 52 is shown slightly smaller than the bottom plate 53. The wheels 50 are shown to one side of the blades 21. The arrows 51 is a representation of the slope which controls the opening and closing of the blades 21 with the direction of the arrow indicating the direction of the slope for down and for up.

FIG. 4 shows one way of opening and closing the blades. The blades or vanes 21 are attached to a 45 degree member 66 and the couplers 61 are attached to this by a bolt 67 and other retainers, (not shown). Then another coupler 61 couples to the next blade and so on to attach all blades to the actuating mechanism.

Three ways to disable the wind generator when batteries are fully charged or during periods of gale force winds are shown in FIGS. 1 and 4. As with the original patent, a slip ring assembly is required for all three ways.

In FIGS. 1 and 4 two solenoids 57 are shown which when actuated would lock into the shafts locking the blades open. Another way would be an electro magnet 58 which when actuated would lock the wheels down when the blades opened.

FIG. 3 is another method by which one set of blades could help another set of blades to assume their proper angle.

In FIG. 3, 54 is attached to the left hand blade and 55 is attached to the right hand blade. FIG. 3 shows the position of the appendages of the blades 21 when in the operating position and when in the position of the appendages of the blades when they are locked open and disabled. In the operating position when one blade closes it helps the other blade to open. With this mode of operation the opposite set of blades would have to be offset to allow the blades shafts to join together.

What is claimed is:

1. Windmill generator apparatus for converting natural wind forces into useful energy comprising the combination of:

a stationary frame a shaft having a vertical longitudinal axis rotatably carried on said stationary frame;

at least four sets of blades outwardly extending from said rotatable shaft at approximately 90 degree angles with respect to each other;

each of the sets of blades having a plurality of blades pivotally mounted on said shaft so as to rotate therwith and pivot between an open position defining a multiplicity of air passageways therebetween and a closed position occupying said air passageways;

wind direction sensing means movably carried on said stationary frame and operably connected to said blades of said blade sets for actuating said blades between their open and closed positions responsive to changes of oncoming wind direction;

means for causing one set of blades while closing to assist the opposite set of blades to open;

means for disabling the wind generator;

mechanical means connecting wind direction sensing means with said blades which includes;

a squash plate solidly connected to said wind direction sensing means which by means of wheels abutting against said squash plate through the action of springs control the opening and closing of said blades automatically.

2. The invention as described in claim 1 including;

a windvane supported by said stationary frame attached to said squash plate to selectively operate the blades of said windmill.

3. The invention as defined in claim 2 wherein said squash plate includes;

a bottom plate with shafts through it and control elements, springs and wheels, with each wheel riding on said squash plate to pivot a selected blade set through a mechanical interface network.

4. The invention as defined in claim 3 wherein;

said wheels include four (4) separate wheels each coupled to a respective set of blades preferably near the center of the blades but displaced from the center shaft of the windmill.

5. The invention as defined in claim 4 wherein;

the blades are opened and closed in a period of time equal to a fixed percentage of one revolution though the action of smooth slopes of the squash plate abutting against said wheels.

6. The invention defined in claim 1 wherein;

said assist means includes a cable means to cause one set of blades to assist another set of blades.

7. The invention defined in claim 1 wherein;

said assist means includes blade appendages to cause one set of blades to assist another set of blades.

8. The invention as defined in claim 1 wherein; said means for disabling said wind generator is operative during periods when batteries charged by said windmill generator are fully charged or during periods of excessive winds.

9. The invention as defined in claim 5 wherein each wheel, while rising by the action of compressed springs to close the blades on its respective blade set aids the opposite wheel to drop to open the blades on the blade set associated with said opposite wheel.

10. The invention as defined in claim 1 means of disabling the wind generator operates by the use of solenoids.

* * * * *